United States Patent [19]

Feller

[11] 4,224,825

[45] Sep. 30, 1980

[54] HEAT METERS

[75] Inventor: Murray F. Feller, Citrus County, Fla.

[73] Assignee: Wilgood Corporation, Jacksonville, Fla.

[21] Appl. No.: 950,787

[22] Filed: Oct. 12, 1978

[51] Int. Cl.³ .................................. G01K 17/16
[52] U.S. Cl. .................................... 73/193 R
[58] Field of Search ......................... 73/193 R

[56] References Cited

U.S. PATENT DOCUMENTS

| 3,617,713 | 11/1971 | Karlsson | 73/193 |
| 3,639,737 | 2/1972 | McKee | 73/193 |
| 4,048,852 | 9/1977 | Sakakibara et al. | 73/193 |

FOREIGN PATENT DOCUMENTS

| 2531922 | 2/1976 | Fed. Rep. of Germany | 73/193 |
| 2318410 | 11/1977 | France | 73/193 |

Primary Examiner—Herbert Goldstein

[57] ABSTRACT

The disclosed apparatus measures the temperature at the inlet and at the outlet of equipment such as a solar heater, and meters the flow of fluid through the equipment. An electrical signal representing the difference between the inlet temperature and the outlet temperature is multiplied by the output signal of the fluid metering device to register the amount of heat exchanged during a given time interval. The volumetric changes of fluid density at the flow meter and the error in performance of the flow meter that may occur due to changes in fluid temperature passing through the flow meter are automatically taken into account in the computation.

10 Claims, 6 Drawing Figures

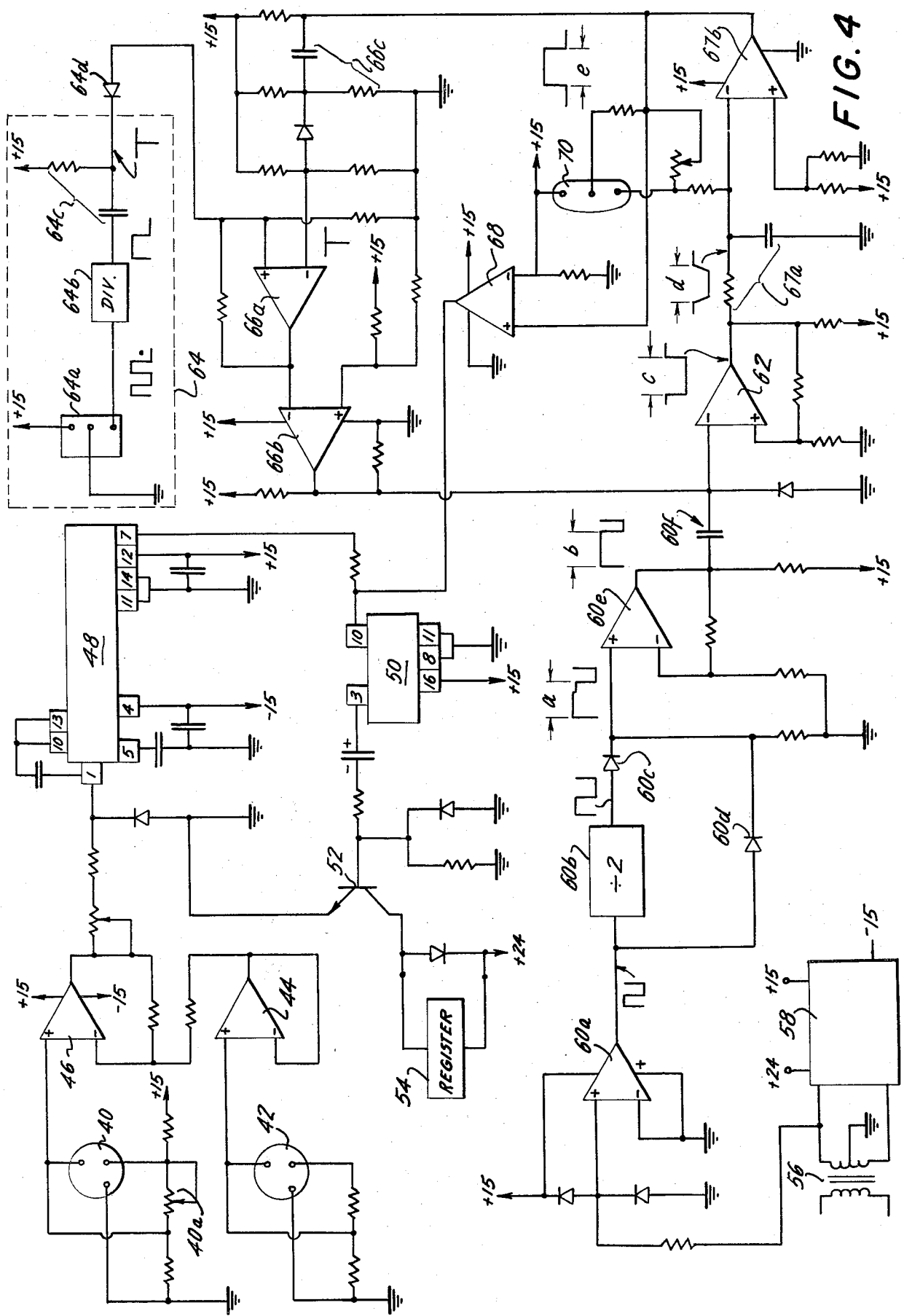

HEAT METERS

The present invention relates to instruments for measuring the quantity of heat supplied or extracted by fluid flowing through a heat exchanger.

BACKGROUND

There has been a long-standing and recently growing need for heat meters. Among the purposes are: for determining the efficiency of a heat exchanger, for evaluating the cost-effectiveness of solar heaters for domestic hot water or for residential heating by means of circulating hot air, for metering the amount of heat (rather than mere volume) in domestic hot water heated in a solar heat-absorber, and more recently for determining the amount of heat absorbed in a form of residential air conditioner served by circulating cold water.

With recent increases in the cost of oil, gas and electricity, the interest in solar heat has risen and, with it, the importance of related instrumentation. For example, it has been proposed to use solar heaters supplemented by electric or fossil-fueled heaters for providing domestic hot water. In such an application, an extremely important concern is to determine the cost-effectiveness of the solar heater in reducing the demand on the conventional hot-water heater which is used as a booster or as a stand-by heater. The investment in the solar heater is to be recouped over a period of time in the heat it delivers over the extended period. The monetary value of the solar heat can be computed in terms of the cost of electrical energy (for example) that would otherwise be needed to provide the heat. In that application, a heat meter is needed for accumulating the heat provided by a solar heat absorber, operable over several seasons of the year if not year-round. Evaluation and sale of solar heaters requires a dependable and accurate yet inexpensive heat meter.

In a related application, it was proposed to meter solar-heated hot water for domestic consumption not merely by measuring the hot water volume but by a heat meter that takes account of both the volume of the hot water and the temperature rise as a measure of energy consumption.

In recent years electromechanical and largely electronic heat meters have been proposed. Such instruments test the temperatures at the inlet and outlet of the heat exchanger, multiply the temperature difference by the metered fluid volume, and accumulate the result over a short or long period of time.

SUMMARY OF THE INVENTION

Both for evaluating the performance of heat exchangers, especially solar heaters, and for making a monetary evaluation of the heat or the cooling effect of delivered fluid, especially water, an accurate heat meter is needed. There has been little if any recognition of temperature-dependent variations in the specific heat of the fluid, for example water, whose volume is one of the fundamental factors in the computation automatically performed in the heat meter. For example, water entering a solar heater at 20° C. has greater specific heat than water entering at 25° C. Hence a given volume of water at 20° C. that has a 50° C. rise in a solar heater absorbs a greater number of heat units than the same volume of water entering the heater at 25° C. and subjected to the same 50° C. rise. Additionally, flow meters have a temperature-related source of error. Equal volumes of water passing through a flow meter at different temperatures do not yield the same reading. In an example, the combined error due to changes of water density and specific heat at different temperatures and the temperature-related error of a water flow meter amounts to 5% over a temperature range of 0°–100° C.

A primary feature of this invention resides in providing compensation for the temperature-dependent variation of density and specific heat of the fluid and the temperature-dependent fluid-metering error in heat meters.

In each illustrative embodiment of the invention detailed below, a flow meter provides a succession of pulses whose repetition rate represents the volume of fluid, and the inlet and outlet fluid temperatures are measured and their difference is taken. In each embodiment the product is taken of the temperature difference signal and the flow-representing pulses. A signal whose frequency is very high (compared to the pulse repetition rate) is used to develop high frequency pulse trains having a number of pulses proportional to the temperature difference for each pulse of the flow meter. A register accumulates the high-frequency pulses over a long period of time, spanning many flow-meter pulses. Compensating means responsive to the fluid temperature at the flow meter is used to modify the number of pulses in each high-frequency pulse train to take into account the changes in density and specific heat of the fluid being metered as well as temperature-dependent error of the fluid meter.

In one embodiment of the invention detailed below, the flow-meter pulses are saw-tooth waves having a ramp or sloping segment, and a signal whose level varies linearly with the temperature difference used to develop a gating signal whose duration is proportional to the temperature difference. The gating signal controls the number of pulses transmitted to a register from a constant high-frequency signal source. The fluid-flow temperature compensating means modifies the slope of the ramp, thereby modifying the duration of the gating signal and the number of high-frequency pulses for each flow-meter pulse.

In a second embodiment, the temperature-difference signal is converted promptly into a high-frequency continuous signal whose frequency is proportional to the temperature difference, and successive constant-width pulses derived from the flow meter are used to gate the high-frequency signal in a signal path to the register. The width of the constant-width pulses is modified for errors due to fluid temperature variations at the metering device.

The nature of the invention and further novel features and advantages will be more fully apparent from the detailed description below of the illustrative embodiments of the invention described in detail below and shown in the drawings.

THE DRAWINGS

In the accompanying drawings:

FIG. 3 and FIG. 4 are a block diagram and a schematic, respectively, of a further embodiment of certain features of the invention in FIGS. 1 and 2, and including further features.

Figure 1:
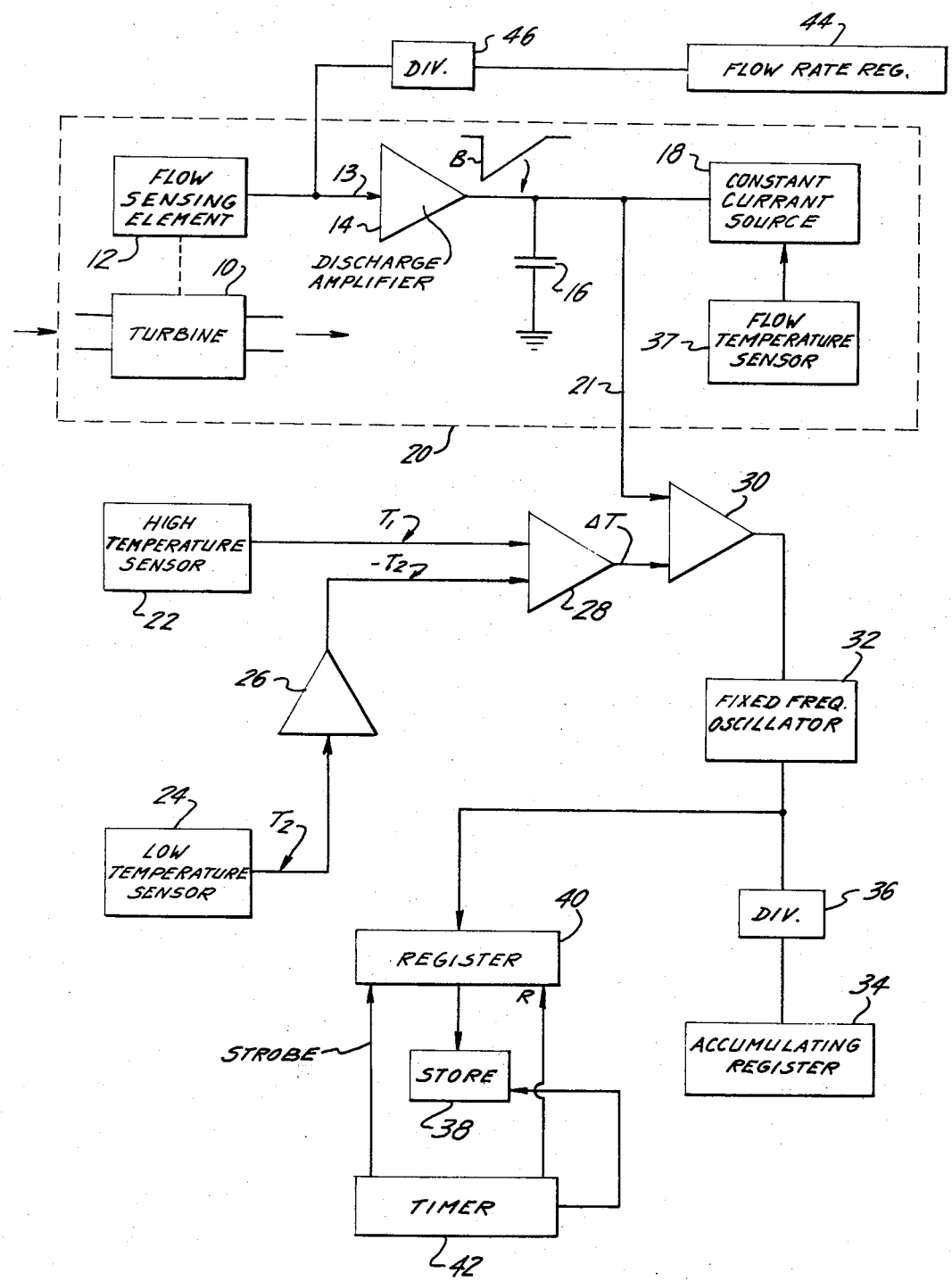
FIG. 1 is a block diagram of an illustrative embodiment of certain features of the invention.

In FIG. 1, a metering device 10 designated "turbine" and including a fluid-activated rotor, activates a flow sensing element 12, yielding a series of electrical pulses at connection 13. The repetition rate of the pulses is proportional to the volume of fluid per unit time. These pulses are applied to high-gain amplifier 14 which acts virtually instantaneously to discharge capacitor 16 in response to each pulse. A current source 18 is provided, having the characteristic of maintaining its current constant despite variation of the voltage at its terminals. Constant-current source 18 causes recharging of capacitor 16 at a linear rate, to impart an accurately linear rising ramp voltage. The charging current is related to the value of capacitor 16 so that recharging is completed in about 80% of the time interval of the flow-rate pulses during the maximum rate of flow to be monitored, such as 30 gallons per minute. The resulting saw-tooth voltage pulses B are delivered by flow-metering unit 20 at connection 21, at a repetition rate representing the volume rate of flow. The duration of the saw-tooth waves is uniform for different flow rates. Each saw-tooth wave has a straight-line ramp or charging segment, and the repetition rate represents the flow rate.

High temperature sensor 22 and low temperature sensor 24 are located in the fluid-flow passage at the hot outlet and the cold inlet points of a heat absorber, especially a solar heat absorber. (In the case of a cooling heat exchanger, the locations of the temperature sensors are reversed.) The electrical output signals of these temperature sensors are made equal at a calibration temperature, and they vary linearly per degree temperature change. The difference between the high- and low-temperature signals is taken by means diagrammatically represented by unity gain inverting amplifier 26 and differential amplifier 28 to yield a temperature-difference signal $\Delta T$.

Comparator 30 acts as a gate, producing output at the start of the charging ramp of each saw-tooth signal on connection 21 applied to one input of the comparator and terminating when that signal exceeds the temperature-difference signal at the other input of comparator 30. The comparator output switches oscillator 32 on and off, or gates the oscillator output on and off. Trains of oscillator pulses are transmitted to digital register 34 through an optionally included divider 36, such as a 1000:1 counting circuit.

In registering the number of heat units per unit of volume of water that is metered, a feature of the invention resides in recognition that multiplication of factors, representing the metered volume of fluid by the temperature change between the inlet and the outlet of the heat exchanger will yield an erroneous result, both because of changes in specific heat of the metered water at different temperatures and because even excellent flow meters have a small temperature-dependent metering error. The foregoing apparatus is specially adapted to introduce correction or compensation for these temperature-dependent factors. A temperature sensor 37 is exposed to the temperature of the fluid flowing through metering device 10, either being immersed in the fluid path or assembled to a portion of the metering device that is in direct, intimate heat-transfer relation to the fluid. Although having a separate designation in FIG. 1, this temperature sensor can actually be one of the temperature sensors 22 or 24, or it can be an additional temperature sensor. As a practical consideration, using a separate temperature sensor may avoid circuit complications.

Temperature sensor 37 is connected to, or is part of, constant current source 18, to introduce temperature dependent adjustment of the value of the charging current to capacitor 16. This modifies the slope of the ramp of pulses B.

For example, if there is an increase in water temperature at sensor 37 and correspondingly a reduction in density of the water or other fluid, each unit of volume will represent fewer heat units than the same volume of fluid (or pulse) at the temperature prevailing before the increase. For the same temperature-difference signal input to differential amplifier 30, there should be a shorter "on" time of oscillator 32 at the higher temperature of the metered water. Hence, when there is an increase in temperature of water (for example) at the flow sensing element 12 and assuming there is no temperature-dependent error in the operation of metering device 10, constant current source 18 is adjusted to provide a corrective increase in the charging-current slope of saw-tooth pulses B. This correction is suitably modified to provide correction for the temperature-dependent error in flow-metering device 10.

Register 34 accumulates a reading representing the number of heat units added (or extracted) by the heat exchanger (not shown) over a time interval. To determine the rate of heat absorbed or extracted in the heat exchanger, the reading of register 34 can be taken in a given time interval. In a practical application, register 34 is scaled to read in 1000-BTU units and to accumulate the heat measurement over a period of many months.

The rate of heat absorbtion per unit time, if this is a desired measurement, could be read from register 34, preferably bypassing divider 36. However, here the rate of heat absorbtion can be read from digital storage 38. The output of oscillator 32 is applied to register 40, and at given time intervals such as once an hour, the value in register 40 is transferred into the storage by a strobe signal from timer 42. The register is then reset automatically by the timer in preparation for a new heat-rate measurement.

Auxiliary apparatus for such equipment may include an optional flow register 44, activated by the output of sensing element 12. In this example, pulse-counting divider 46 is included where the flow reading is to be accumulated over a comparably long time interval for which register 34 is to accumulate heat units.

Figure 2:
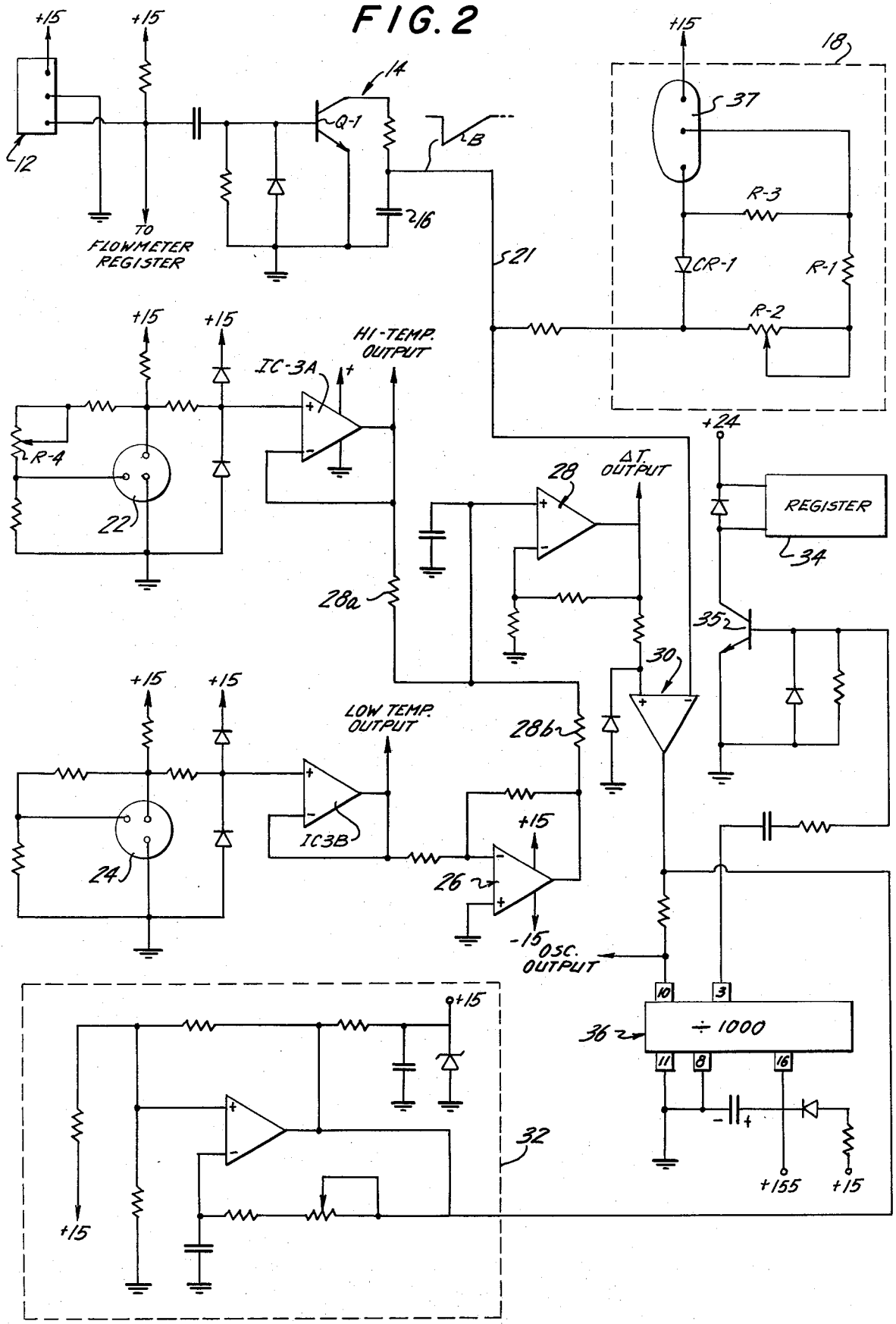
FIG. 2 is a schematic of a portion of the embodiment of FIG. 1.

FIG. 2 represents an illustrative yet highly successful circuit for implementing that portion of FIG. 1 represented by numerals 12 through 37. Many components shown in the drawing are not described individually in the interest of brevity. They are represented by customary symbols, they have their normal functions in the circuit shown, and they are to that extent incorporated in this specification. Flow metering device 10 of FIG. 1 includes a liquid-driven rotor carrying a small magnet. An example of such a flow-sensor is more fully disclosed in my copending application Ser. No. 935,562 filed Aug. 21, 1978 entitled, "Rotation Sensor." The magnet affects a Hall-effect sensor 12 in FIG. 2. This Hall-effect sensor and related circuitry is a commercially available device, Type UGN 3020 T, made by Sprague Electric Co. Transistor Q-1 is normally blocked. When a driving pulse is received from sensor 12, transistor Q-1 (part of circuit 14) abruptly discharges capacitor 16.

Device 37 and 18 constitute a temperature-varied constant-current integrated circuit, for example a commercially available temperature sensor Type LM 334Z made by National Semiconductor Corp. The entire circuit 18 is epoxied to flow metering device 10 for intimate exposure to the fluid temperature. The value of the current carried by constant-current circuit 18 is determined by the values of the resistors in its network, selected to determine the slope and time duration of the charging segment of pulse B. Rectifier CR-1 responds to the same temperature as that which affects device 37 but the temperature coefficients of these devices are opposites. The current supplied by device 37 increases with temperature. Resistor R-3 determines the level of the constant-current of device 37. The temperature variation of that constant current is modified by resistors R-1 and R-2 in combination with rectifier CR-1. Temperature-adjusted constant current source 18 causes capacitor 16 to charge linearly and thus causes the voltage across capacitor 16 to increase linearly with time.

Temperature sensors 22 and 24 (which may be commercially available integrated circuits Type LM335H made by National Semiconductor Corp.) are temperature-adjusted constant-current devices that sense the high and low temperatures of the system. They are selected to track, or yield equal output at identical temperatures over the range of interest. Using resistor R4, these temperature sensors are adjusted to yield balanced output when the inlet and outlet temperatures of the heat absorber are equal. Unity-gain buffer amplifiers IC-3A and IC-3B in an example provide about 10 millivolts per °C. output. These amplifiers couple the outputs of sensors 22 and 24 to a differencing circuit including an inverting operational amplifier 26 and resistors 28a and 28b. The junction of these resistors is connected to the "plus" input of amplifying comparator 28. With 10 mv./°C. output of amplifiers IC-3A and IC-3B, the signal is 5 mv. per degree C. at the junction of resistors 28a, 28b over a 100° C. temperature range. With a stabilized accurate gain of 20, the output of amplifier 28 has a range of 0 to 10 volts for a 0° to 100° C. range of temperature difference between inlet and outlet temperatures of the heat absorber.

Comparator 30 (a high-gain amplifier with little or no feedback) turns "on" the output of constant-frequency oscillator 32 for all values of voltage across capacitor 16 (represented by the slant segment of pulse B) from zero to that value which equals the output signal from amplifier 28. The number of pulses B per minute varies with the rate of flow, and the duration of output pulses from comparator 30 varies with the temperature difference. Therefore the average "on" time at the output of oscillator 32 varies as the product of the temperature-compensated volume of liquid flow and temperature difference. The output pulses of the oscillator are divided by 1000 by divider 36 in an example. The divided output is supplied to through driver 35 to an electronic digital register 34 which has a sufficient capacity to accumulate the heat units (divided by 1000) absorbed (for example) by a solar hot water heater over a six-month period or longer.

The circuit shown is simplified, as compared to that of an actual practical heat meter in some respects. Regulated direct-current supply means is omitted, as are spike-suppressing diodes commonly used to avoid erroneous operation that might result from spurious pulses. The operation of the entire circuit could be inaccurate if the supply voltage were low, so that an operation-suppressing circuit responsive to under voltage can be included. Those features are omitted as not germane to the essential circuit for implementing the invention.

Figure 3:
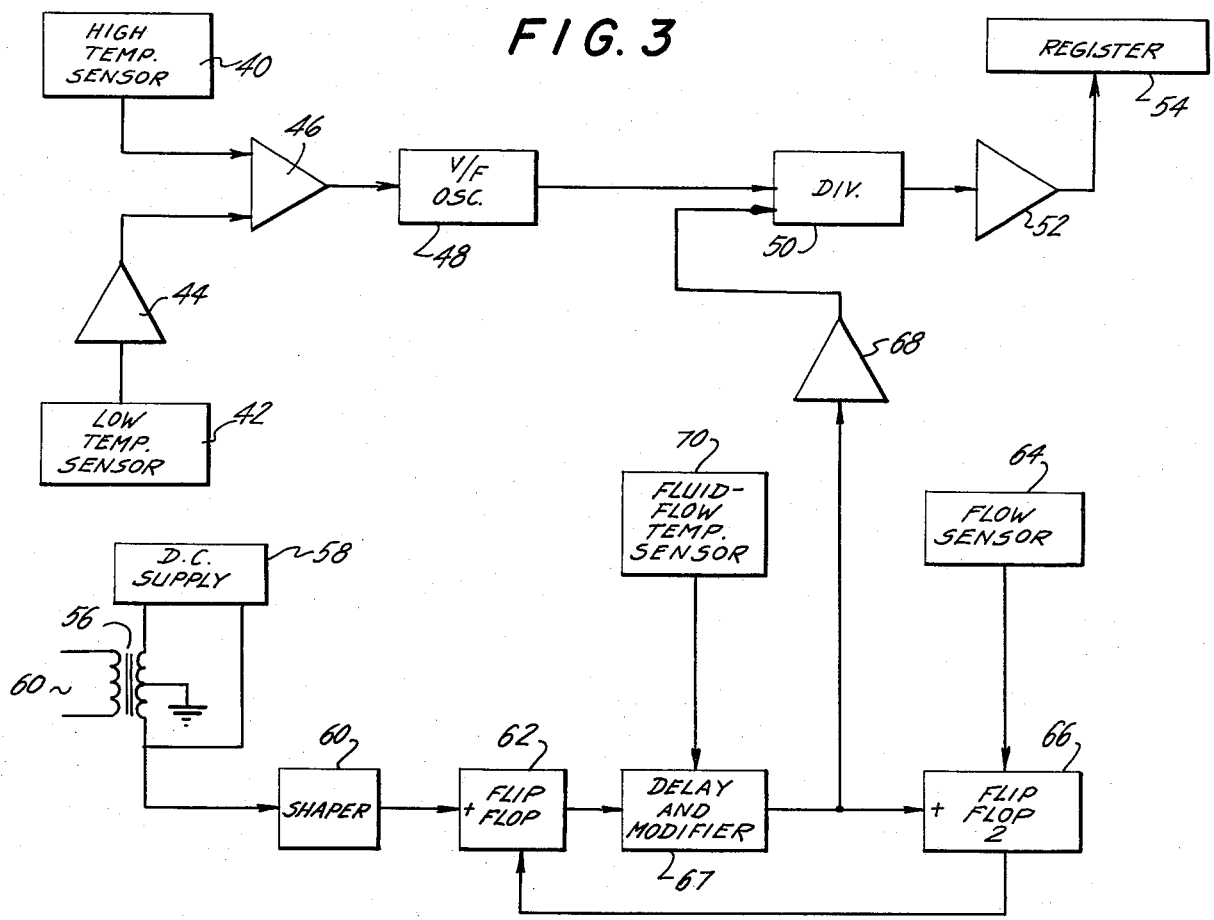

FIGS. 3 and 4 show an alternative to FIG. 2, with added features As in the case of FIG. 2, circuit components such as resistors, capacitors and diodes included in this Figure for their customary purposes are part of the disclosure of the circuit even where specific discussion is omitted in the interest of conciseness.

Integrated circuits 40 and 42 (for example Type LM335H, available from National Semiconductor Corp.) are constant-current devices that are temperature responsive. These are installed at the high-temperature and low-temperature ends of the heat exchanger whose effectiveness is to be monitored. A unity-gain inverting operational amplifier 44 is interposed between temperature sensor 42 and the "minus" input of differential amplifier 46. The output of high temperature sensor 40 is connected directly to the "plus" input of amplifier 46.

The output of amplifier 46 is the voltage difference between the high- and low-temperature voltages of sensors 40 and 42, increased by the constant gain of amplifier 46. Resistor 40a is adjusted to produce zero voltage output from amplifier 46 when both sensors 40 and 42 are exposed to the same temperature. Sensors 40 and 42 are selected to track over the temperature range to be monitored.

Integrated circuit device 48 (for example Type VFC32KP, made by Burr-Brown Research Corp. of Tucson, Ariz.) with its connected components forms a variable voltage-to-frequency converting oscillator. The frequency and range of frequency can be adjusted for calibration. The output frequency is divided or scaled down by a factor of $2^n$ using binary counter or divider 50, such as integrated circuit Type IC4020 made by National Semiconductor Corp. Driver 52 couples the divider to register 54, advantageously having a counting capacity sufficient to accumulate 1000-BTU's (or other thermal units) over a long operating period such as six months or a year.

Input power at transformer 56 from an AC source of highly stable frequency, such as commercial 60 Hz energizes DC supply 58 to provide operating potentials for the entire circuit of FIG. 4. The alternating-current wave is applied to a wave shaper 60 (FIG. 3). In FIG. 4, this includes squaring device 60a that emits alternating negative and positive pulses of 8.333 milliseconds each for 60 Hz input; one-stage binary divider 60b that emits positive squared pulses of 16.67-millisecond duration recurring at 30 Hz; and diodes 60c and 60d which combine the 8.333 m..sec. pulses of squaring device 60a and the 16.67 m. sec. pulses of divider 60b to yield 25.0 m. sec. pulses a. These pulses a are further shaped by comparator 60e to yield 25.0 m. sec. pulses b. Coupling network 60f provides positive and negative spikes which switch comparator 62 alternately on and off, subject to enabling control by comparator or high-gain amplifier 66b to be described.

Flow sensor 64a (sensors 37 and 64 i a are alike) supplies pulses to one- or two-stage binary divider 64b and differentiating R-C circuit 64c and diode 64d to yield a train of negative spikes representing rate-of-flow of the fluid. These spikes are applied to flip-flop 66 (FIG. 3). More particularly, these spikes are applied to the "plus" input of a bistable circuit including amplifier 66a so as to shut off this amplifier and to switch "on" the connected inverting high gain amplifier or comparator 66b. When the output of amplifier 66b is thus made "high", comparator or high-gain amplifier 62 acting as a flip-flop is enabled by this control bias at its "minus" input to respond to the next ensuing positive and negative spikes from shaper 60 (network 60f in FIG. 4) spaced apart 25.0 m sec. Conversely, when the output of amplifier 66b of flip-flop 66 (FIG. 3) is negative, flip-flop 62 is disabled from responding to the 25.0 m sec. pulses available from shaper 60.

At the output of flip-flop 62, there is a delay and pulse-width modifying circuit 67, including an integrating R-C network 67a. Circuit 67 slightly delays the fall and subsequent rise of the 25.0 m sec. pulses (pulses d, FIG. 4). These pulses are sharpened in amplifier 67b to become slightly delayed 25.0 m sec. pulses e. The trailing ends of these pulses are converted to negative spikes in network 66c and applied to the "minus" input of comparator or high-amplifier 66a arranged as a flip-flop. The result is that amplifier 66a is turned on by a pulse derived from flip-flop 62 and amplifier 66b is switched off. The resulting disabling bias applied to flip-flop 62 prevents it from responding to further spikes from network 60f of shaper 60 until the next pulse from the flow meter. Because of delay network 67a, assurance is had that, once amplifier 62 is allowed by amplifier 66b to respond to a negative spike from network 60f, amplifier 62 will be in condition to respond to the next positive-going pulse from network 60f, accurately timed to be 25.0 m sec. later.

Pulses from the flow sensor converted into negative spikes reaching amplifier 66a can be timed to recur slightly slower than once every 1.875 cycles of the 25 m. sec. pulses, e.g. about 15 negative spikes per second, at a maximum flow rate of 30 gallons per minute in an example. At that rate, once a pulse from the flow sensor acts via bistable circuit 66a and inverting bias-providing amplifier 66b to enable amplifier 62, the next available pair of positive and negative spikes spaced 25.0 m sec. apart can be depended upon to produce a 25.0 m. sec. squared pulse c at the output of amplifier 62. Due to delay circuit 67a, amplifiers 66a and 66b are reset slightly after the end of squared pulse c and these amplifiers are made ready to respond to the next signal from the flow meter.

The squared 25.0 m. sec. pulses e from shaper 67b are applied to a buffer amplifier 68 to gate "on" the transmission channel from the output of oscillator 48 to the register, acting at the input of divider 50. Since the frequency of the pulses from the voltage-to-frequency converting oscillator 48 represents the temperature difference and since the total number of pulses from amplifier 68 is determined by the flow sensor 64, the number frequency-divided oscillator pulses reaching the register 54 is the product of the sensed temperature difference and the total volume of fluid flow over any long period of time of operation of the register.

Figure 5:
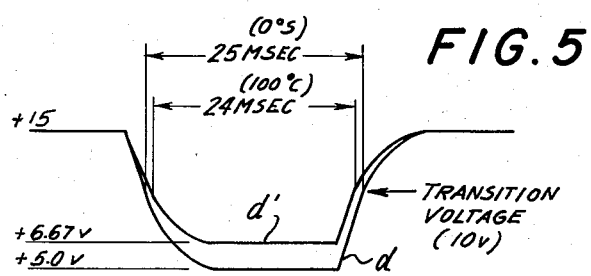
FIG. 5 is a voltage-versus-time diagram of pulses occuring under two different conditions in FIGS. 3 and 4.

For accurate measurement of the heat absorbed or given up by the heat exchanger, strictly speaking it is not enough to use the volume of fluid as one factor, since the number of heat units in a given volume of fluid such as water will vary with the specific heat of the fluid at the flow-metering temperature. Moreover, the flow meter may undergo temperature-dependent dimensional changes which cause metering inaccuracy. In the apparatus of FIGS. 3 and 4, the errors resulting from these factors are compensated within a second-order magnitude of error by introducing temperature sensor 70 (e.g. LM334Z mentioned above) that modifies the duration of pulses e. Sensor 70 is installed on the flow meter in intimate heat-transfer relation to the fluid or in the adjoining flow path to sense the metered-fluid temperature. As seen in FIG. 5, the apparatus can be adjusted so that, for water at 0° C., the switching points of amplifier 67b at its transition voltage (the input voltage at which it switches from its high to low state or the reverse) are spaced apart by exactly 25.0 m. sec. When there is a temperature increase, sensor 70 changes pulse d (the 0° C. pulse) to pulse d', thus reducing the drop of the nominally 25.0 m. sec. pulse and reducing the spread of the declining and rising segments of the pulse. If the specific heat of water declines approximately 4% from 0°–100° C. and if the flow-meter has a 1% error in the same direction over the same temperature range, the effect of sensor 70 can be adjusted to produce a 5% change in the width of pulse e. Acting through comparator 68 (FIG. 4) this causes a reduction in the "on" times of the pulse-transmission channel from oscillator 48 to the register, to provide the desired compensation. In FIG. 5, the width of pulse d' at the transition voltage is 24.0 m sec. at 100° C., a reduction of 5% from 0° to 100° C. The variation of the specific heat of water and the flow-meter error may not be truly linear from 0° to 100° C., and the effect of sensor 70 on integrating circuit 67a may not be linear, yet the correction eliminates the primary error and leaves only a second-order error.

The integrating circuit 67a can be made of carefully selected components and the energizing voltages of this circuit can also be designed for stability, and oscillator 48 can be chosen for immunity to ambient temperature changes, to realize the full benefits of the foregoing provision of compensation for temperature variation of the fluid being metered. However, if the circuit is affected by the operating temperature of the circuit itself, either the circuit temperature should be held constant or the circuit can include compensation for changes in its own operating temperature. For example, a further compensating temperature-responsive device like 70 may be connected in parallel with device 70, exposed to the temperature of the other circuit components that are unintentionally temperature-variable.

Figure 6:
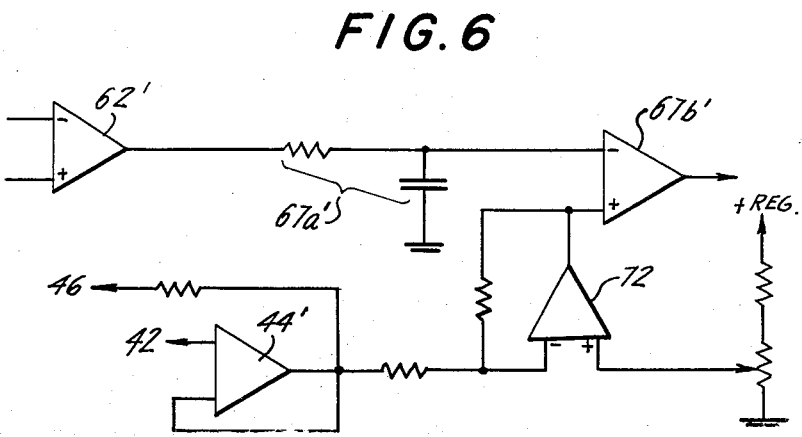
FIG. 6 is a modification of a portion of FIG. 4.

It has been noted above that it is not necessary to use a separate compensating temperature-variable device in addition to the fluid temperature sensors that are necessarily part of the circuit. FIG. 6 illustrates utilization of the low-temperature sensor 42 in a modification of the circuit of FIG. 3 not only for its normal function in deriving the outlet-to-inlet temperature difference of the fluid, but also for compensating the registered heat output for the effect of temperature changes on the specific heat of the metered fluid and for temperature-variation in the accuracy of the flow meter. For this purpose, of course the flow meter and sensor 42 should be exposed to the same fluid temperature. In FIG. 6, elements bearing primed numerals are the same as those bearing corresponding numerals in FIG. 4, and the remainder of FIG. 4 is to be incorporated in FIG. 6 except that temperature sensor 70 is to be omitted from FIG. 6. In place of sensor 70, sensitivity to the fluid temperature at the flow meter for temperature compensation is provided by sensor 42 (FIG. 4) via inverting amplifier 44' that is part of the temperature-difference circuit. An inverter 72 is included (e.g. an integrated-circuit comparator) having associated bias-adjusting and gain-controlling resistors. The output of amplifier 44' is inverted and applied to the "plus" input of comparator 67b', with the same effect as described above in relation to FIG. 5. Indeed, if compensation for the effect of temperature changes on the circuit components is desired, and if the sense of the required correction corresponds to that of device 70 (FIG. 4), a device 70 may be connected in FIG. 6 as in FIG. 4 and exposed to the temperature of the circuit.

The foregoing embodiments of various features of the invention are exemplary, but they are naturally amenable to variation and varied application by those skilled in the art. Therefore the invention should be construed broadly, consistent with its full spirit and scope.

What is claimed is:

1. Apparatus for measuring the thermal energy change of a fluid that passes from an inlet through a heat-exchange zone to an outlet, including inlet and outlet electrical fluid-temperature-responsive devices, means responsive to said devices for deriving a temperature-difference signal representing the difference between the inlet and outlet temperatures of the fluid, fluid-metering means for providing a series of impulses whose repetition rate represents the volume rate of fluid flow, means responsive to the impulses of said fluid-metering means for producing a train of triangular waves each having a sharp front and an ensuing slope, a signal generator for providing a constant-frequency signal recurring a large number of times during each said triangular wave, registering means, means responsive to said triangular-wave producing means and said temperature-difference signal deriving means for developing successive enabling signals whose individual durations in relation to their recurrence time intervals represent the product of the temperature difference and the flow rate of the fluid, and means responsive to said enabling signals for causing entry of said constant-frequency signals into said register intermittently.

2. Apparatus as in claim 1 for measuring thermal energy change, wherein said fluid-metering means includes a portion exposed to the fluid, said apparatus including means responsive to the fluid temperature at said portion of the fluid-metering means for adjusting the duration of said enabling signals to compensate approximately for temperature-related error in the response of said fluid-metering means to the mass-rate of fluid flow.

3. Apparatus as in claim 1 for measuring thermal energy change, wherein said fluid-metering means includes a portion exposed to the fluid, said apparatus including means responsive to the fluid temperature at said portion of the fluid-metering means for modifying the incline of said slope of each triangular wave so as to provide compensation for temperature-related error in the response of said fluid-metering means to the mass-rate of fluid flow.

4. Apparatus as in claim 3, wherein said means for producing a train of triangular waves includes a capacitor and resistor means for controlling the rate-of-change of charge stored in the capacitor, and wherein said incline modifying means includes a temperature variable resistor forming part of said resistor means.

5. Apparatus as in claim 4, wherein said resistor means has an essentially constant-current characteristic.

6. Apparatus as in claim 4, wherein said temperature-variable resistor is a temperature-adjusted essentially constant-current device additional to said fluid-temperature-responsive devices.

7. Apparatus for measuring the thermal energy change of a fluid that passes from an inlet through a heat-exchange zone to an outlet, including inlet and outlet electrical fluid-temperature-responsive devices, means responsive to said devices for deriving a temperature-difference signal representing the difference between the inlet and outlet temperatures of the fluid, fluid-metering means for providing a series of impulses whose repetition rate represents the volume rate of fluid flow, means responsive to an alternating current source for deriving rectangular timing waves having a dependence in duration and frequency on the alternating current source and recurring at a faster rate than the fluid-metering series of impulses, a voltage-to-frequency converter responsive to said temperature-difference signal, a register, and gating means acting under control of said fluid-metering means in dependence on the flow rate for allowing only selected ones of said signals from said rectangular wave deriving means to enable transmission of the output of the voltage-to-frequency converter to said register, thereby to represent the thermal energy change of the fluid between the inlet and the outlet.

8. Apparatus as in claim 7, wherein said fluid-metering means includes a portion exposed to the fluid, said apparatus including means responsive to the temperature at said portion of the fluid-metering means for modifying the duration of the portions of said timing waves that enable transmission of signals to the register to compensate approximately for temperature-related error in the response of the fluid-metering means to the mass-flow rate of the fluid.

9. Apparatus as in claim 8 wherein said duration-modifying means includes means for introducing slope to at least one end of each said enabling portion of the rectangular waves and wherein said temperature-responsive means at said portion of the fluid-metering means regulates the level of response of the gating means to the modified rectangular waves for thereby providing error compensation as aforesaid.

10. Apparatus as in claim 7, further including a rectifying supply having input from the alternating source for deriving direct-current energization to portions of said apparatus.

* * * * *